(12) United States Patent
Lin

(10) Patent No.: US 10,168,144 B2
(45) Date of Patent: Jan. 1, 2019

(54) OPTICAL APPARATUS FOR 3D DATA COLLECTION

(71) Applicant: SONY CORPORATION, Tokyo (JP)

(72) Inventor: Tzunghan Lin, Taipei (TW)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/081,095

(22) Filed: Mar. 25, 2016

(65) Prior Publication Data

US 2017/0276477 A1    Sep. 28, 2017

(51) Int. Cl.
*G01B 11/245*    (2006.01)

(52) U.S. Cl.
CPC .................. *G01B 11/245* (2013.01)

(58) Field of Classification Search
CPC ........ G02B 2027/0178; G02B 27/0172; G02B 26/0833; G02B 2006/12104; G02B 6/43; G02B 26/0841; G02B 21/0064; G02B 26/085; G02B 26/0816; G02B 6/3512; G02B 6/3518; G02B 6/0031; G02B 27/288; G01N 2021/6419; G01N 21/4738; G01B 11/24; G01B 11/25; G01B 11/06; G01B 11/254
See application file for complete search history.

(56) References Cited

U.S. PATENT DOCUMENTS

| | | | |
|---|---|---|---|
| 4,945,239 A * | 7/1990 | Wist ..................... | A61B 5/0091 250/339.02 |
| 5,519,603 A | 5/1996 | Allbery, Jr. et al. | |
| 6,650,357 B1 * | 11/2003 | Richardson ............... | G01J 3/10 348/80 |
| 7,312,924 B2 | 12/2007 | Trissel | |
| 7,724,378 B2 | 5/2010 | Babayoff | |
| 8,390,822 B2 | 3/2013 | Dillon et al. | |
| 8,451,318 B2 * | 5/2013 | Trubko .................. | G02B 13/06 348/335 |
| 2003/0045530 A1 | 3/2003 | Snutch | |
| 2003/0160789 A1 | 8/2003 | Tang et al. | |
| 2006/0070966 A1 | 4/2006 | Koudys et al. | |
| 2006/0118742 A1 * | 6/2006 | Levenson ............ | A61B 5/0059 250/559.3 |

(Continued)

FOREIGN PATENT DOCUMENTS

| | | |
|---|---|---|
| JP | 2009-088844 A | 4/2009 |
| JP | 2012-181077 A | 9/2012 |

(Continued)

OTHER PUBLICATIONS https://en.wikipedia.org/wiki/Dichroic_filter.*

(Continued)

*Primary Examiner* — Mohamed K Amara
(74) *Attorney, Agent, or Firm* — Chip Law Group

(57) ABSTRACT

The present disclosure relates to an optical apparatus of collecting three dimensional information of an object, which includes a first optical module, a second optical module and an optical detector. The first optical module provides a first light beam of a first wavelength range in accordance with light reflected from the object. The second optical module provides a second light beam of a second wavelength range in accordance with the light reflected from the object. The optical detector detects the first light beam and the second light beam.

17 Claims, 24 Drawing Sheets

(56) References Cited

U.S. PATENT DOCUMENTS

| | | | | |
|---|---|---|---|---|
| 2007/0223076 A1* | 9/2007 | Knebel | ............. | G02B 21/0032 |
| | | | | 359/209.1 |
| 2008/0027317 A1* | 1/2008 | Wood | ................... | A61B 5/0059 |
| | | | | 600/427 |
| 2009/0080730 A1 | 3/2009 | Pavlidis | | |
| 2010/0019170 A1* | 1/2010 | Hart | ........................ | A61C 5/14 |
| | | | | 250/459.1 |
| 2012/0229816 A1* | 9/2012 | Rodrigue | ............. | G01B 11/245 |
| | | | | 356/610 |
| 2013/0050711 A1* | 2/2013 | Ertl | ........................ | A61C 19/00 |
| | | | | 356/612 |
| 2013/0147916 A1* | 6/2013 | Bennett | .................. | G01B 11/24 |
| | | | | 348/46 |
| 2015/0286340 A1* | 10/2015 | Send | ........................ | G01S 17/46 |
| | | | | 345/175 |
| 2016/0202178 A1* | 7/2016 | Acosta | ................... | G01N 21/27 |
| | | | | 356/303 |

FOREIGN PATENT DOCUMENTS

| | | |
|---|---|---|
| JP | 2014-178190 A | 9/2014 |
| JP | 2016-161351 A | 9/2016 |

OTHER PUBLICATIONS

International Search Report and Written Opinion of PCT Application No. PCT/JP2017/005552, dated May 16, 2017, 04 pages of English Translation and 03 pages of ISRWO.

\* cited by examiner

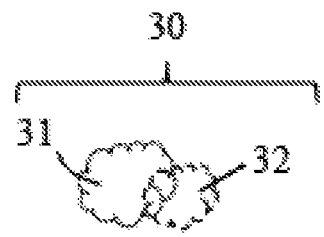
FIG. 7A
 
FIG. 7B FIG. 7C

OPTICAL APPARATUS FOR 3D DATA COLLECTION

BACKGROUND

Three dimensional (3D) data collection of an object may rely on speed, accuracy, and portability for purposes such as reproduction. 3D data collection technique may be applied in fields of digital imaging, computer animation, topography, reconstructive and plastic surgery, dentistry, internal medicine, rapid prototyping, etc.

Optical apparatuses may be used to the shape, contour, position or other information of the object in digitized form. For example, an optical apparatus using triangulation may include two cameras to receive light which is reflected from an object and the determines three-dimensional spatial locations for points where the light reflects from the object.

Lens of relatively longer focal length may be used to increase depth of focus and may inevitably increase physical size of the optical apparatus or adversely affect miniaturization of the optical apparatus.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7A illustrates an image of an object in accordance with some embodiments of the present disclosure.

FIG. 7B illustrates an image of an object in accordance with some embodiments of the present disclosure.

FIG. 7C illustrates an image of an object in accordance with some embodiments of the present disclosure.

DETAILED DESCRIPTION

Figure 1:
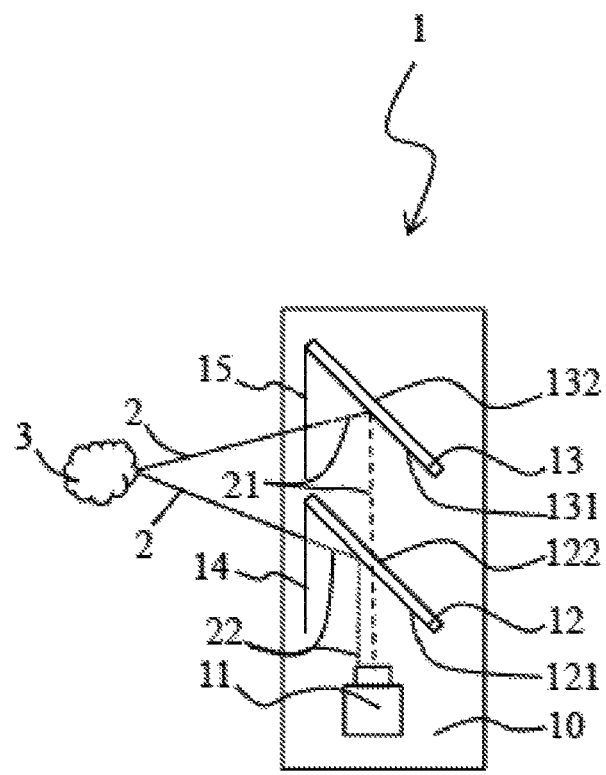
FIG. 1 illustrates an optical apparatus of collecting three dimensional information of an object in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarify and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotates 90 degrees or at other orientations) and the spatially relative descriptors used herein may likewise be interpreted accordingly.

Referring to the figures, wherein like numerals indicate like parts throughout the several views, FIG. 1 illustrates an optical apparatus of collecting three dimensional information of an object in accordance with some embodiments of the present disclosure. Referring to FIG. 1, an optical apparatus 1 of collecting three dimensional information of an object 3 may include a carrier 10, an optical detector 11, mirrors 12 and 13, and filters 14 and 15.

The carrier 10 may be a board made of, for example but is not limited to plastic, metal or another suitable material, to support the optical detector 11, mirrors 12 and 13, and filters 14 and 15.

An optical module (not denoted in FIG. 1) may include the mirror 13 and the filter 15 to provide a light beam 21 of a wavelength range or spectrum from approximately 540 nanometers (nm) to approximately 560 nm. The light beam 21 may include, for example but is not limited to green light.

The filter 15 is disposed between the object 3 and the mirror 13. Ambient light (not shown in FIG. 1) which is incident on the object 3 may be reflected by the object 3. The filter 15 receives light 2 reflected from or the object 3 and outputs the light beam 21. For example, the filter 15 may be but is not limited to a green light filter, and the light beam 21 of the reflected light 2 may pass the filter 15 (while the rest of the reflected light 2 other than the light beam 21 may be blocked or absorbed by the filter 15). The light beam 21 which is incident on the mirror 13 may be directed to the optical detector 11. The filter 15 may be a band pass filter.

Another optical module (not denoted in FIG. 1) may include the mirror 12 and the filter 14 to provide a light beam 22 of a wavelength range or spectrum from approximately 610 nm to approximately 630 nm. The light beam 22 may include, for example but is not limited to red light.

The filter 14 is disposed between the object 3 and the mirror 12. Ambient light (not shown in FIG. 1) which is incident on the object 3 may be reflected by the object 3. The filter 14 receives light 2 reflected from the object 3 and outputs the light beam 22. For example, the filter 14 may be but is not limited to a red light filter, and the light beam 22 of the reflected light 2 may pass the filter 14 (while the rest of the reflected light 2 other than the light beam 22 may be blocked or absorbed by the filter 14). The filter 14 may be a band pass filter. The light beam 22 whish is incident on the mirror 12 may be direct to the optical detector 11. The mirror 12 is disposed or arranged at a position different from a position where the mirror 13 is disposed on the carrier 10. The mirror 12 and the mirror 13 may be arranged in parallel.

It is contemplated that the filters 14 and 15 may be switched in accordance with some embodiments of the present disclosure. It is contemplated that one of the filters 14 and 15 may be replace by another filter (e.g. violet, blue, yellow, or orange light filter) in accordance with some embodiments of the present disclosure. It is contemplated that both the filters 14 and 15 may be replaced by another pair of filters (e.g. any two of violet, blue, yellow and orange light filters) in accordance with some embodiments of the present disclosure.

The optical detector 11 may sense or detect the light beam 21 and the light beam 22. The optical detector 11 receive the light beam 21 and the light beam 22 from different positions.

It is contemplated that the optical apparatus 1 may further include electronics (shown in FIG. 1) on the carrier 10. The electronics of the optical apparatus 1 may include a memory, a processor, a controller, etc. For example, optical information (e.g. the light beam 21 and the light beam 22) received by the optical detector 11 may be stored in the electronics (e.g. the memory). For example, the controller may control the detector 11 (e.g. to move or rotate the detector 11 to adjust the field of view of the detector 11.

Figure 1A:
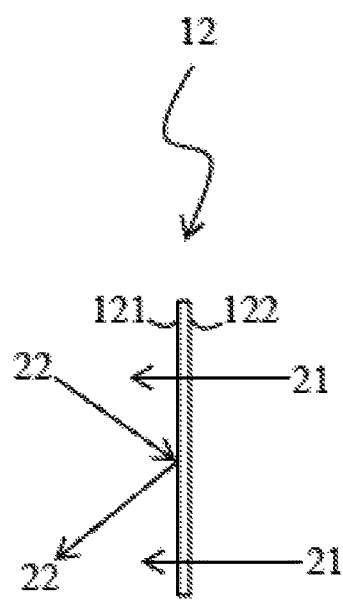
FIG. 1A illustrates a mirror in accordance with some embodiments of the present disclosure.

FIG. 1A illustrates a mirror in accordance with some embodiments of the present disclosure.

Referring to FIG. 1A, the mirror 12 as shows is FIG. 1 includes a surface 121 and a surface 122 opposite the surface 121. The mirror 12 may be a semi-transparent mirror. The surface 121 of the mirror 12 may reflect light from the left side (but may be changed to another direction in other embodiments of the present disclosure), such as the light beam 22 as shown in FIG. 1. Reflective material may be formed on the surface 121 of the mirror 12. The surface 122 of the mirror 12 may be transparent to light, such as the light beam 21 as shown in FIG. 1. The light beam 21 from the right side (but may be changed to another direction in other embodiments of the present disclosure) may pass through the mirror 12.

Figure 1B:
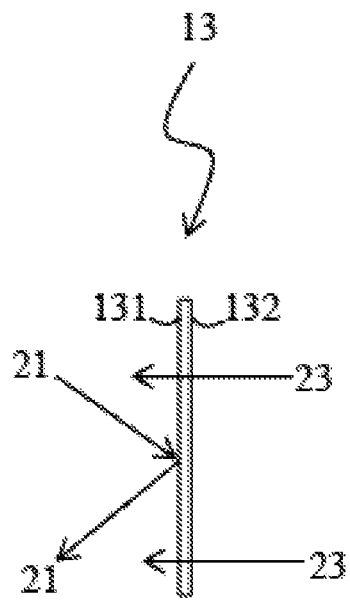
FIG. 1B illustrates another mirror in accordance with some embodiments of the present disclosure.

FIG. 1B illustrates another mirror in accordance with some embodiments of the present disclosure.

Referring to FIG. 1B, the mirror 13 as shown in FIG. 1 includes a surface 131 and a surface 132 opposite the surface 131. The mirror 13 may be a semi-transparent mirror. The surface 131 of the mirror 13 may reflect light from the left side (but may be changed to another direction in other embodiments of the present disclosure), such as the light beam 21 as shown in FIG. 1. Reflective material may be formed on the surface 131 of the mirror 13. The surface 132 of the mirror 13 may be transparent to light, such as ambient light 23. The ambient light 23 from the right side (but may be changed to another direction in other embodiments of the present disclosure) may pass through the mirror 13.

Figure 1C:
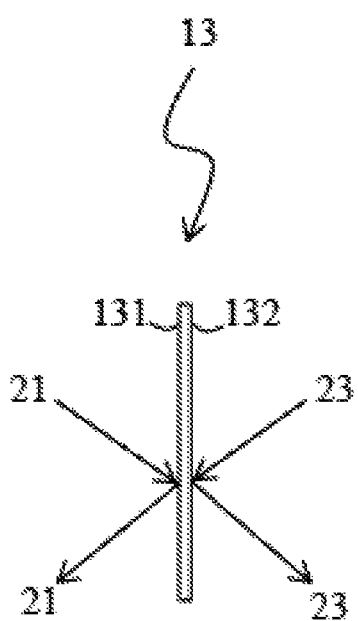
FIG. 1D illustrates spectra detected by the optical apparatus of FIG. 1 in accordance with some embodiments of the present disclosure.
FIG. 1E illustrates another optical apparatus of collecting three dimensional information of an object in accordance with some embodiments of the present disclosure.
FIG. 1F illustrates a spectrum of light illuminated from the illumination source of FIG. 1E in accordance with some embodiments of the present disclosure.
FIG. 1G illustrates spectra detected by the optical apparatus of FIG. 1E in accordance with some embodiments of the present disclosure.
FIG. 1H illustrates another optical apparatus of collecting three dimensional information of an object in accordance with some embodiments of the present disclosure.
FIG. 1I illustrates another mirror in accordance with some embodiments of the present disclosure.
FIG. 1J illustrates another mirror in accordance with some embodiments of the present disclosure.
FIG. 1K illustrates another mirror in accordance with some embodiments of the present disclosure.
FIG. 1L illustrates another optical apparatus of collecting three dimensional information of an object in accordance with some embodiments of the present disclosure.

FIG. 1C illustrates another mirror in accordance with some embodiments of the present disclosure.

Referring to FIG. 1C, the mirror 13 is similar to the mirror 13 as shown in FIG. 1B, except that reflective material may be formed on both the surfaces 131 and 132 of the mirror 13. The surface 132 of the mirror 13 may reflect light from the right side (but may be changed to another direction in other embodiments of the present disclosure), such as the ambient light 23.

Referring back to FIG. 1, the filter 15 is disposed between the object 3 and the surface 131 of the mirror 13. Ambient light (not shown in FIG. 1) which is incident on the object 3 may be reflected by the object 3. The filter 15 receives light 2 reflected from or the object 3 and outputs the light beam 21 to the surface 131 of the mirror 13. For example, the filter 15 may be but is not limited to a green light filter, and the light beam 21 of the reflected light 2 may pass the filter 15 (while the rest of the reflected light 2 other than the light beam 21 may be blocked or absorbed by the filter 15). The light beam 21 which is incident on the surface 131 of the mirror 13 may be reflected or directed to the optical detector 11 through the mirror 12. The light beam 21 is transmitted from the surface 131 of the mirror 13 through the mirror 12 to the optical detector 11.

The filter 14 is disposed between the object 3 and the surface 121 of the mirror 12. Ambient light (not shown in FIG. 1) which is incident on the object 3 may be reflected by the object 3. The filter 14 receives light 2 reflected from or the object 3 and outputs the light beam 22 to the surface 121 of the mirror 12. For example, the filler 14 may be but is not limited to a red light filter, and the light beam 22 of the reflected light 2 may pass the filter 14 (while the rest of the reflected light 2 other than the light beam 22 may be blocked or limited by the filter 14). The light beam 22 which is incident on the surface 121 of the mirror 12 may be directed or reflected to the optical detector 11. The surface 122 of the mirror 12 allows the light beam 21 to pass through the mirror 12.

Figure 1D:
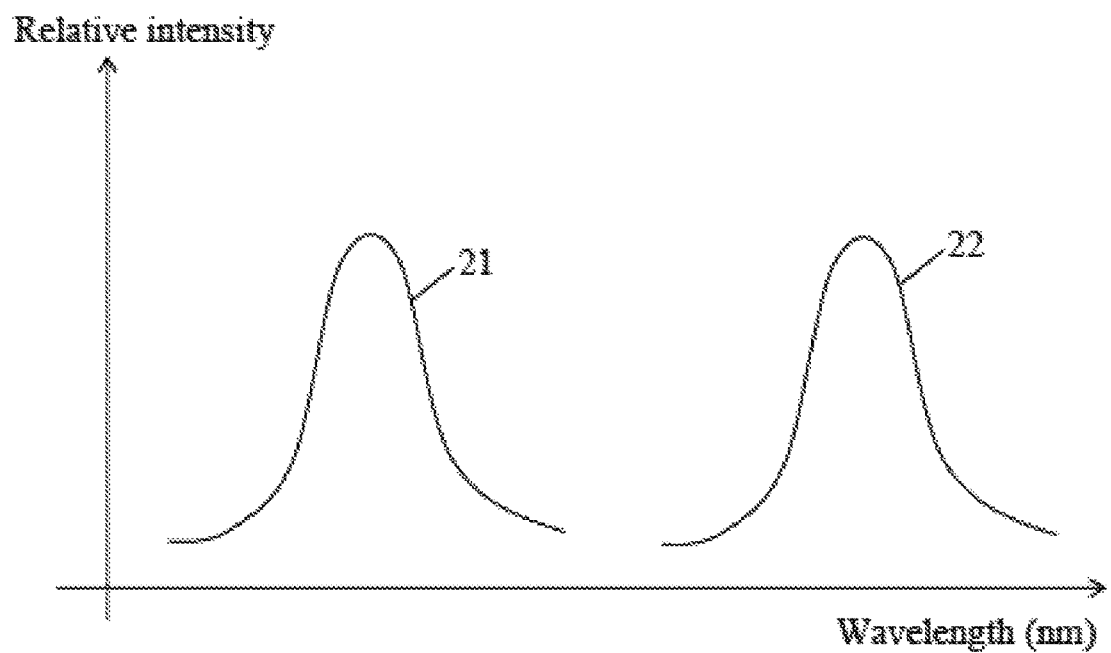

FIG. 1D illustrates spectra detected by the optical apparatus of FIG. 1 in accordance with some embodiments of the present disclosure. Referring to FIG. 1D, the wavelength range or spectrum of the light beam 21 is from approximately 540 nm to approximately 560 nm and the wavelength range or spectrum of the light beam 22 is from approximately 610 nm to approximately 630 nm.

Figure 1E:
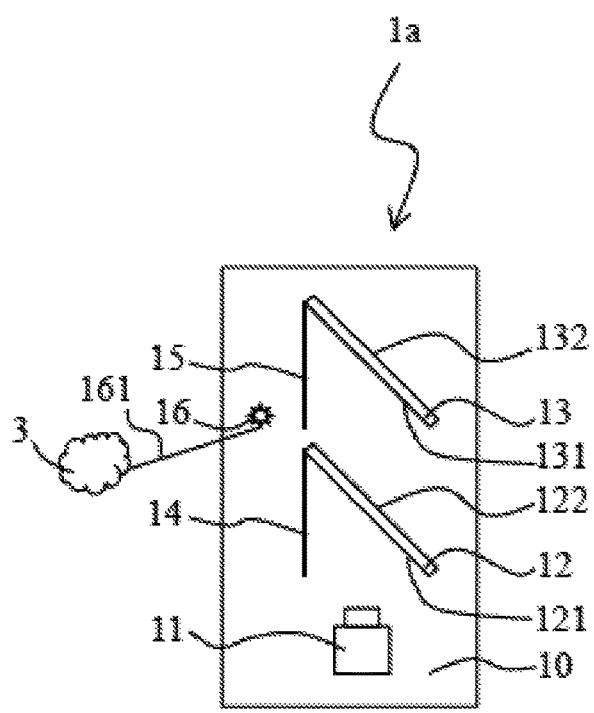

FIG. 1E illustrates another optical apparatus of collecting three dimensional information of an object in accordance with some embodiments of the present disclosure. Referring to FIG. 1E, an optical apparatus 1a of collecting three dimensional information of an object 3 is similar to the optical apparatus 1 as illustrated and described with reference to FIG. 1, except that the optical apparatus 1a further includes an illumination source 16. The illumination source 16 may illuminate a light pattern, for example but is mot limited to randomly distributed light spots, a star, a triangle, etc. The illumination source 16 may illuminate a light beam 161 of a wavelength range or spectrum from approximately 380 nm to approximately 780 nm. The wavelength range or spectrum of the light beam 161 overlaps both the wavelength range or spectrum of the light beam 21 and the wavelength range or spectrum of the light beam 22.

Figure 1F:
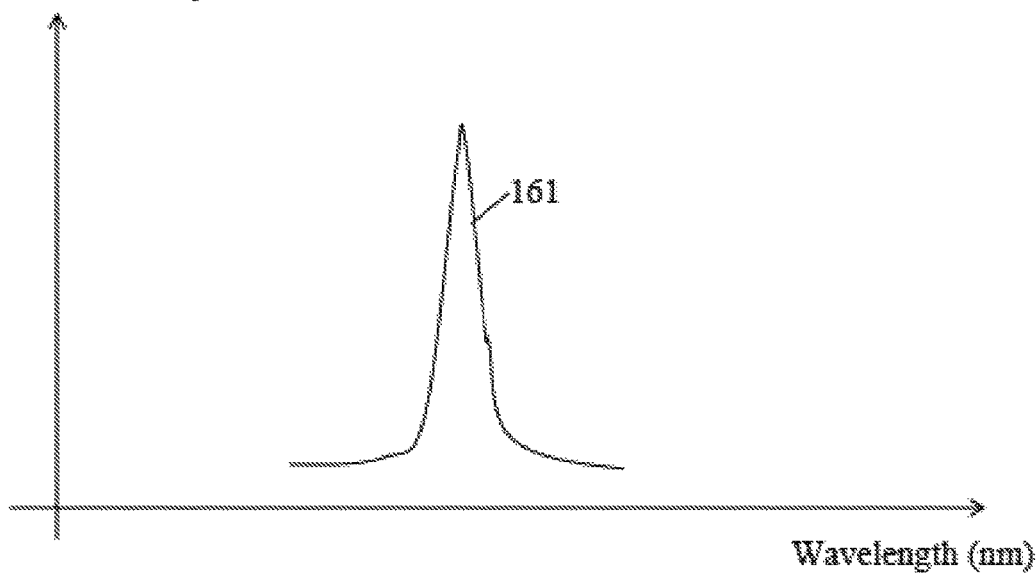

FIG. 1F illustrates a spectrum of light illuminated from the illumination source of FIG. 1E in accordance with some embodiments of the present disclosure. Referring to FIG. 1F, a wavelength range or spectrum of the light beam 161 is from approximately 570 nm to approximately 600 nm.

Figure 1G:
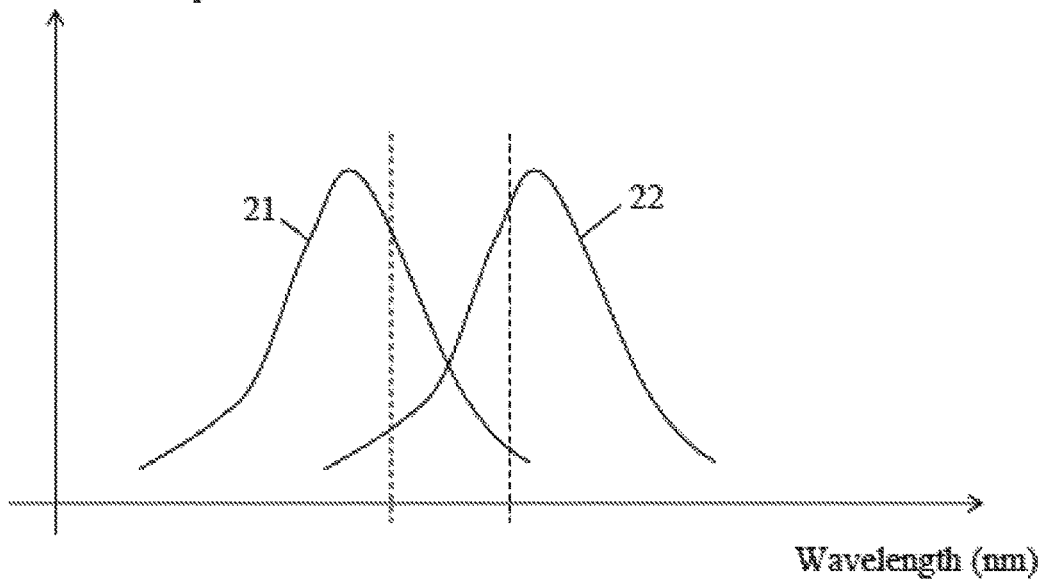

FIG. 1G illustrates spectra detected by the optical apparatus of FIG. 1E in accordance with some embodiments of the present disclosure. Referring to FIG. 1G, the wavelength range or spectrum of the light beam 21 is from approximately 550 nm to approximately 610 nm and the wavelength range or spectrum of the light beam 22 is from approximately 570 nm to approximately 630 nm. A part of the wavelength range or spectrum (from approximately 540 nm to approximately 600 nm) of the light beam 21 overlaps the wavelength range or spectrum of the light beam 22.

Figure 1H:
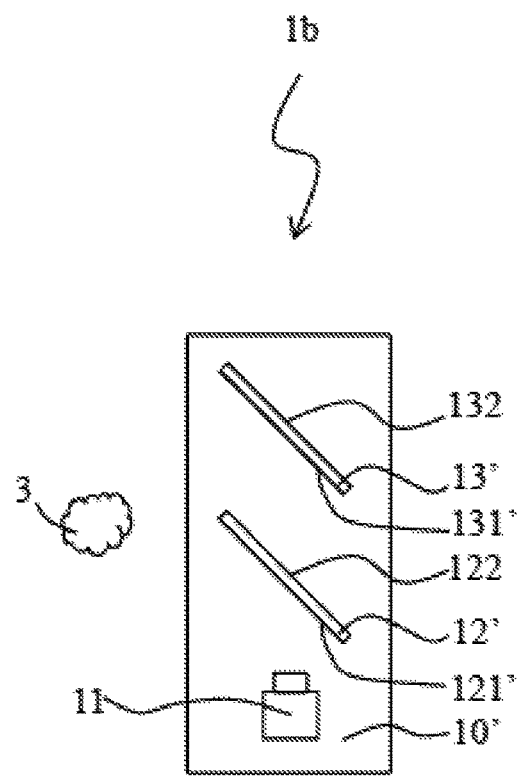

FIG. 1H illustrates another optical apparatus of collecting three dimensional information of an object in accordance with some embodiments of the present disclosure. Referring to FIG. 1H, an optical apparatus 1b of collecting three dimensional information of an object 3 is similar to the optical apparatus 1 as illustrated and described with reference to FIG. 1, except that the mirror 13 is replaced by a mirror 13' while the mirror 12 is replaced by a mirror 12', and the filters 14 and 15 are eliminated. Details of the mirrors 12' and 13' will be described below with reference to FIG. 1I, FIG. 1J and FIG. 1K. The carrier 10' may have a width smaller than that of the carrier due to the elimination of the filters 14 and 15.

Figure 1I:
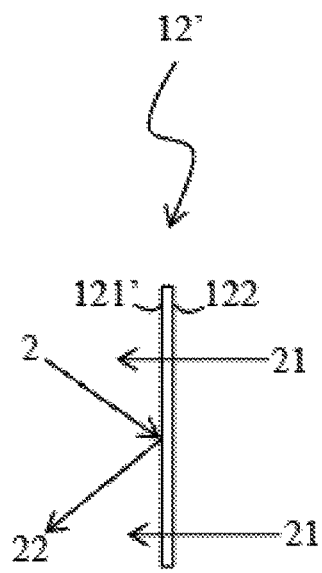

FIG. 1I illustrates another mirror in accordance with some embodiments of the present disclosure. Referring to FIG. 1I, the mirror 12' is similar to the mirror 12 as illustrated and described with reference to FIG. 1A, except that a filter film (not shown in FIG. 1I) is formed on a surface 121' of the mirror 12'.

Ambient light (not shown in FIG. 1) which is incident on the object 3 may be reflected by the object 3. The mirror 12' received light 2 reflected from the object 3 and outputs the light beam 22. For example, the filter film (not shown in FIG. 1I) may be but is not limited to a red light filter film, and the light beam 22 of the reflected light 2 may pass the filter film (while the rest of the reflected light 2 other than the light beam 22 may be blocked or absorbed by the filter film).

The mirror 12' may be a semi-transparent mirror. The surface 121' of the mirror' 12 may filter and reflect light from the left side (but may be changed to another direction in other embodiments of the present disclosure), such as the reflected light 2 as shown in FIG. 1. Reflective material may be formed on the surface 121' of the mirror 12. The surface 122 of the mirror 12' may be transparent to light, such is the light beam 21 as shown in FIG. 1. The light beam 21 from the right side (but may be changed to another direction in other embodiments of the present disclosure) may pass through the mirror 12'.

Figure 1J:
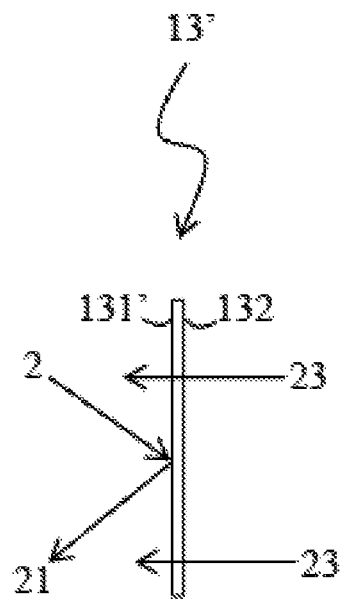

FIG. 1J illustrates another mirror in accordance with some embodiments of the present disclosure. Referring to FIG. 1J, the mirror 13' is similar to the mirror 13 as illustrated and described with reference to FIG. 1B, except that a filter film (not shown in FIG. 1J) is formed on a surface 131' of the mirror 13'.

Ambient light (not shown in FIG. 1) which is incident on the object 3 may be reflected by the object 3. The mirror 13' receives light 2 reflected from or the object 3 and output the light beam 21. For example, the filter film may be but is not limited, to a green light filter film, and the light beam 21 of the reflected light 2 may pass the filter film (while the rest of the reflected light 2 other than the light beam 21 may be blocked or absorbed by the filter film). The light beam 21 which is incident on the mirror 13' may be directed to the optical detector 11.

The mirror 13' may be a semi-transparent mirror. The surface 131' of the mirror 13' may filter and reflect light from the left side (but may be changed to another direction in other embodiments of the present disclosure), such as the reflected light 2 as shown in FIG. 1. Reflective material may be formed on the surface 131' of the mirror 13'. The surface 132 of the mirror 13' may be transparent to light, such as ambient light 23. The ambient light 23 from the right side (but may be changed to another direction in other embodiments of the present disclosure) may pass through the mirror 13'.

Figure 1K:
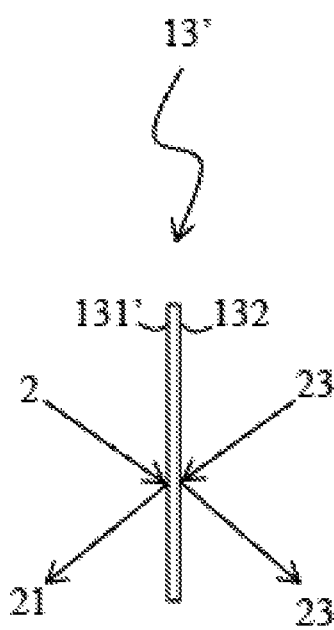

FIG. 1K illustrates another mirror in accordance with some embodiments of the present disclosure. Referring to FIG. 1K, the mirror 13' is similar to the mirror 13' as shown in FIG. 1J, except that reflective material may be formed on both the surfaces 131' and 132 of the mirror 13'. The surface 132 of the mirror 13 may reflect light from the right side (but may be changed to another direction in other embodiments of the present disclosure), such as the ambient light 23.

Figure 1L:
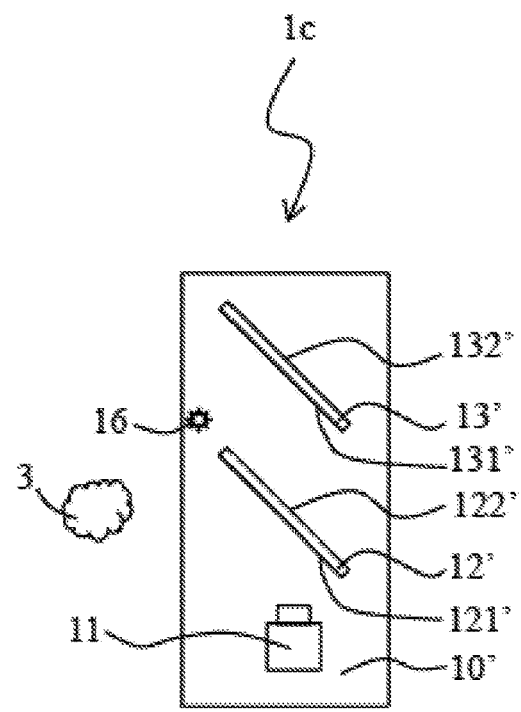

FIG. 1L illustrates another optical apparatus of collecting three dimensional information of an object in accordance with some embodiments of the present disclosure. Referring to FIG. 1L, an optical apparatus 1c of collecting three dimensional information of an object 3 is similar to the optical apparatus 1b as illustrated and described with reference to FIG. 1H, except that the optical apparatus 1c further includes an illumination source 16.

Figure 2:
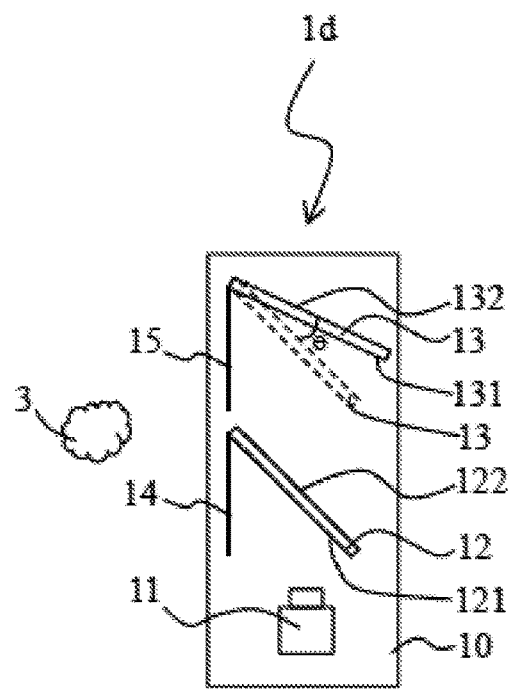
FIG. 2 illustrates another optical apparatus of collecting three dimensional information of an object in accordance with some embodiments of the present disclosure.

FIG. 2 illustrates another optical apparatus of collecting three dimensional information of an object in accordance with some embodiments of the present disclosure. Referring to FIG. 2, an optical apparatus 1d of collecting three dimensional information of an object 3 is similar to the optical apparatus 1 as illustrated and described with reference to FIG. 1, except that the mirror 13 of FIG. 2 is counterclockwise rotated by an angle θ. The mirror 12 and the mirror 13 may be unparallelly arranged. It is contemplated that the mirror 13 may be clockwise rotated. It is contemplated that the mirror 12 may be rotated.

Figure 2A:
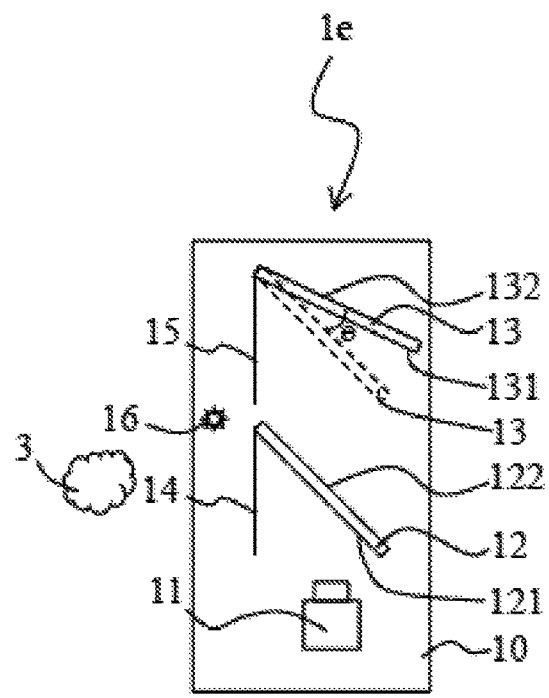
FIG. 2A illustrates another optical apparatus of collecting three dimensional information of an object in accordance with some embodiments of the present disclosure.

FIG. 2A illustrates another optical apparatus of collecting three dimensional information of an object in accordance with some embodiments of the present disclosure. Referring to FIG. 2A, an optical apparatus 1e of collecting three dimensional information of an object 3 is similar to the optical apparatus 1d as illustrated and described with reference to FIG. 2, except that the optical apparatus 1e further includes an illumination source 16.

Figure 2B:
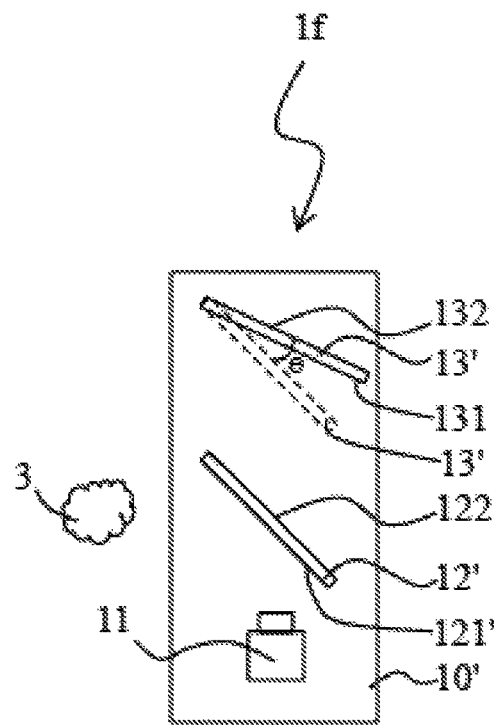
FIG. 2B illustrates another optical apparatus of collecting three dimensional information of an object in accordance with some embodiments of the present disclosure.

FIG. 2B illustrates another optical apparatus of collecting three dimensional information of an object in accordance with some embodiments of the present disclosure. Referring to FIG. 2B, an optical apparatus 1f of collecting three dimensional information of an object 3 is similar to the optical apparatus 1b as illustrated and described with reference to FIG. 1H, except that the mirror 13' of FIG. 2B is counterclockwise rotated by an angle θ. The mirror 12' and the mirror 13' may be unparallelly arranged. It is contemplated that the mirror 13' may be clockwise rotated. It is contemplated that the mirror 12' may be rotated.

Figure 2C:
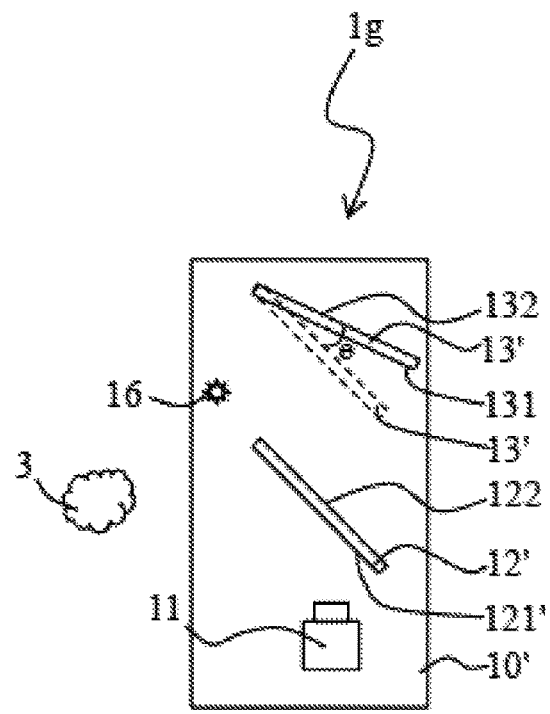
FIG. 2C illustrates another optical apparatus of collecting three dimensional information of an object in accordance with some embodiments of the present disclosure.

FIG. 2C illustrates another optical apparatus of collecting three dimensional information of an object in accordance with some embodiments of the present disclosure. Referring to FIG. 2C, an optical apparatus 1g of collecting three dimensional information of an object 3 is similar to the optical apparatus 1f as illustrated and described with reference to FIG. 2B, except that the optical apparatus 1g further includes an illumination source 16.

Figure 3:
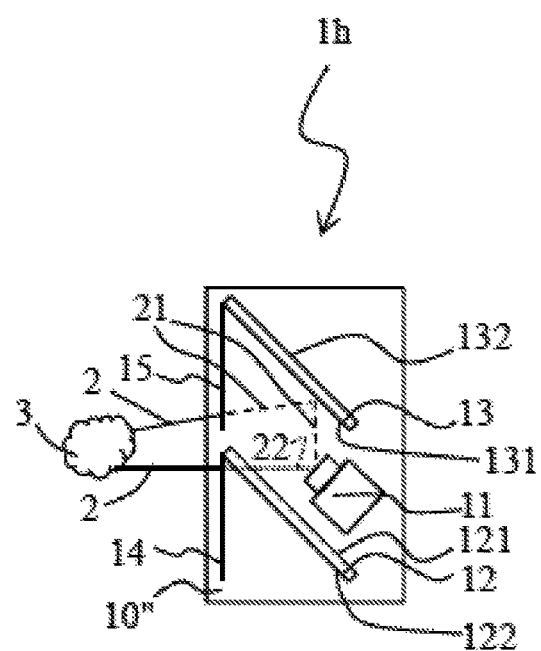
FIG. 3 illustrates another optical apparatus of collecting three dimensional information of an object in accordance with some embodiments of the present disclosure.

FIG. 3 illustrates another optical apparatus of collecting three dimensional information of an object in accordance with some embodiments of the present disclosure. Referring to FIG. 3, an optical apparatus 1h of collecting three dimensional information of an object 3 is similar to the optical apparatus 1 as illustrate and described with reference to FIG. 1, except that the optical detector 11 is disposed between the optical module (which includes the mirror 12 and the filter 14) and the optical module (which includes the mirror 13 and the filter 15), the mirror 12 is rotated by 180 degree, and the carrier 10 is replaced by a carrier 10". The detector 11 is rotated by an angle between zero degree and ninety degree as compared to FIG. 1 such that the field of view, the depth of focus and other optical modulus of the detector 11 in view of the light beam 21 and the light beam 22 may be adjusted.

The optical module (which includes the mirror 12 and the filter 14) directly provides the light beam 22 in accordance with light 2 reflected from the object 3 to the optical detector 11. The filter 14 is disposed between the optical detector 11 and the object 3. The mirror 12 is disposed between the filter 14 and the optical detector 11. The filter 14 receives the reflected light 2 from the object 3 and outputs the light beam 22 which then passes through the mirror 12 to the optical detector 11. The optical detector 11 is disposed between the surface 121 of the mirror 12 and the surface 131 of the mirror 13. The surface 121 of the mirror 12 faces the optical detector 11.

The carrier 10" may have a relatively short length as compared to the carrier 10 of optical apparatus 1 of FIG. 1.

The optical module (which includes the mirror 13 and the filter 15) directly provides the light beam 21 in accordance with the light 2 reflected from the object 3 to the optical, detector 11.

Figure 3A:
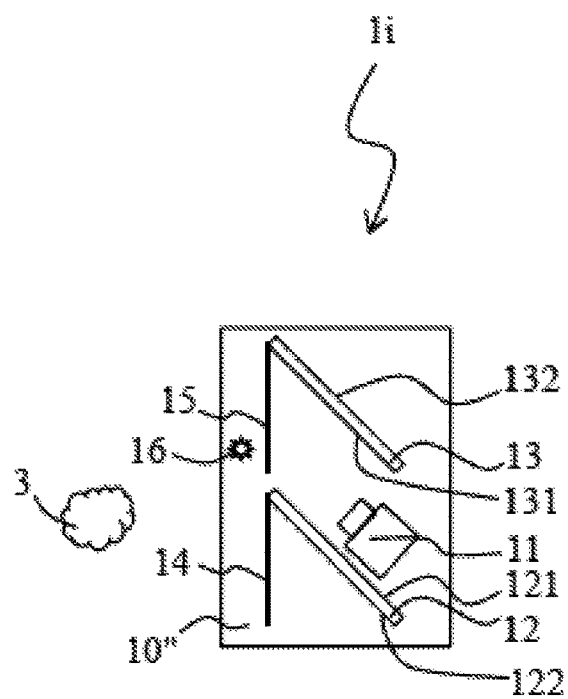
FIG. 3A illustrates another optical apparatus of collecting three dimensional information of an object in accordance with some embodiments of the present disclosure.

FIG. 3A illustrates another optical apparatus of collecting three dimensional information of an object in accordance with some embodiments of the present disclosure. Referring to FIG. 3A, an optical apparatus 1i of collecting three dimensional information of an object 3 is similar to the optical apparatus 1b as illustrated and described with reference to FIG. 3, except that the optical apparatus 1*i* further includes an illumination source 16.

Figure 3B:
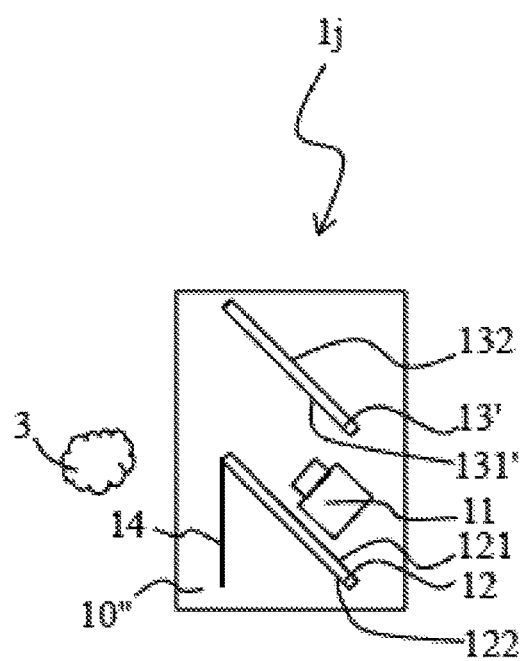
FIG. 3B illustrates another optical apparatus of collecting three dimensional information of an object in accordance with some embodiments of the present disclosure.

FIG. 3B illustrates another optical apparatus of collecting three dimensional information of an object in accordance with some embodiments of the present disclosure. Referring to FIG. 3B, an optical apparatus 1*j* of collecting three dimensional information of an object 3 is similar to the optical apparatus 1*b* as illustrated and described with reference to FIG. 3, except that the mirror 13 is replaced by the mirror 13' and the filter 15 is eliminated.

Figure 3C:
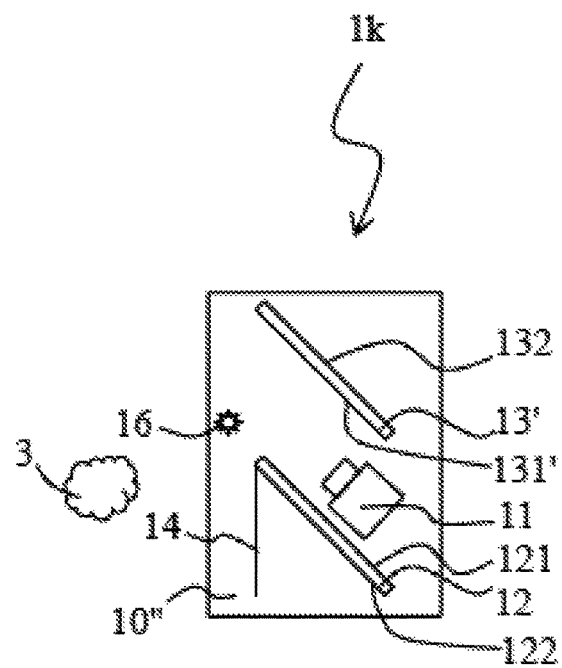
FIG. 3C illustrates another optical apparatus of collecting three dimensional information of an object in accordance with some embodiments of the present disclosure.

FIG. 3C illustrates another optical apparatus of collecting three dimensional information of an object in accordance with some embodiments of the present disclosure. Referring to FIG. 3C, an optical apparatus 1*k* of collecting three dimensional information of an object 3 is similar to the optical apparatus 1*j* as illustrated and described with reference to FIG. 3B, except that the optical apparatus 1*k* further includes an illumination source 16.

Figure 3D:
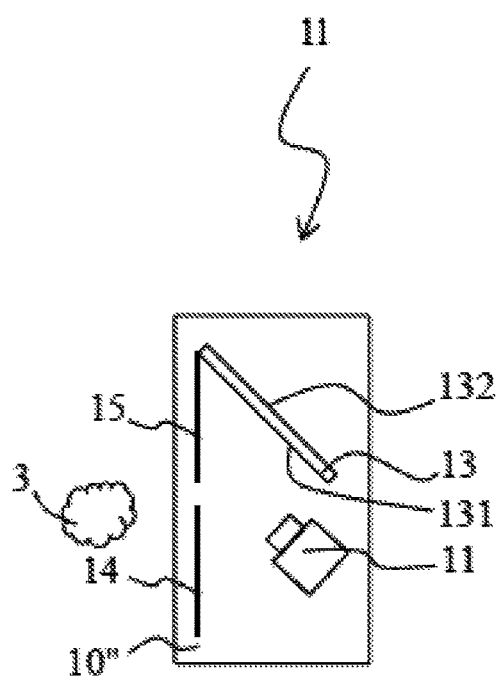
FIG. 3D illustrates another optical apparatus of collecting three dimensional information of an object in accordance with some embodiments of the present disclosure.

FIG. 3D illustrates another optical apparatus of collecting three dimensional information of an object in accordance with some embodiments of the present disclosure. Referring to FIG. 3D, an optical apparatus 1*l* of collecting three dimensional information of an object 3 is similar to the optical apparatus 1*h* as illustrated and described with reference to FIG. 3, except that the mirror 12 is eliminated.

Figure 3E:
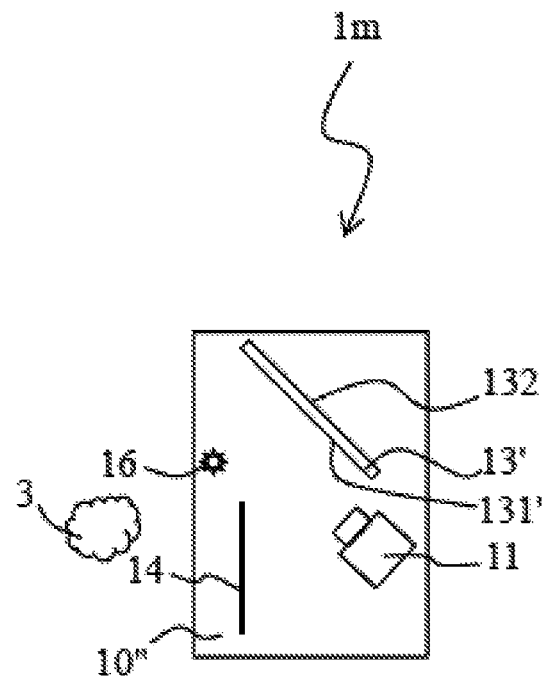
FIG. 3E illustrates another optical apparatus of collecting three dimensional information of an object in accordance with some embodiments of the present disclosure.

FIG. 3E illustrates another optical apparatus of collecting three dimensional information of an object in accordance with some embodiments of the present disclosure. Referring to FIG. 3E, an optical apparatus 1*m* of collecting three dimensional information of an object 3 is similar to the optical apparatus 1*l* as illustrated and described with reference to FIG. 3D, except that the optical apparatus 1*m* further includes and illumination source 16, the mirror 13 is replaced by the mirror 13' and the filter 15 is eliminated.

Figure 3F:
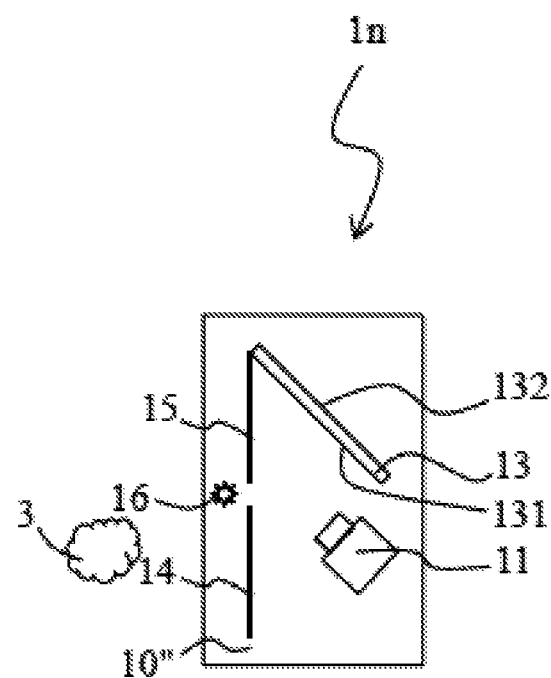
FIG. 3F illustrates another optical apparatus of collecting three dimensional information of an object in accordance with some embodiments of the present disclosure.

FIG. 3F illustrates another optical apparatus of collecting three dimensional information of an object in accordance with some embodiments of the present disclosure. Referring to FIG. 3F, an optical apparatus 1*n* of collecting three dimensional information of an object 3 is similar to the optical apparatus 1*l* as illustrated and described with reference to FIG. 3D, except that the optical apparatus 1*n* further includes an illumination source 16.

Figure 3G:
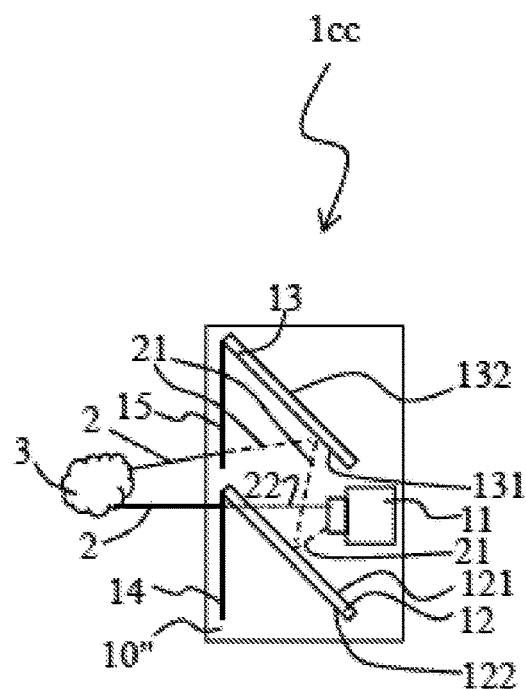
FIG. 3G illustrates another optical apparatus of collecting three dimensional information of an object in accordance with some embodiments of the present disclosure.

FIG. 3G illustrates another optical apparatus of collecting three dimensional information of an object in accordance with some embodiments of the present disclosure. Referring to FIG. 3G, as optical apparatus 1*cc* of collecting three dimensional information of an object 3 is similar to the optical apparatus 1*h* is illustrated and described with reference to FIG. 3, except that the detector 11 is further rotated to be substantially parallel to a side of the carrier 10" such that the field of view, the depth of focus and other optical modulus of the detector 11 in view of the light beam 21 and the light beam 22 may be adjusted.

The optical module (which includes the mirror 13 and the filter 15) indirectly provides the light, beam 21 in accordance with the light 2 reflected from the object 3 to the optical detector 11. The mirror 13 has a reflective surface 131 and the filter 15 is disposed between the object 3 and the surface 131 of the mirror 13. The filter 15 receives the light 2 reflected from the object 3 and outputs the light beam 21 to the surface 131 of the mirror 13, which may direct the light beam 21 to the surface 121 of the mirror 12, wherein the surface 121 of the mirror 12 may further direct the light beam to the optical detector 11.

The optical module (which includes the mirror 12 and the filter 14) directly provides the light beam 22 in accordance with light 2 reflected from the object 3 to the optical detector 11. The filter 14 is disposed between the optical 11 and the object 3. The mirror 12 is disposed between the filter 14 the optical detector 11. The filter 14 receives the reflected light 2 from the object 3 and outputs the light beam 22 which then passes through the mirror 12 to the optical detector 11. The optical detector 11 is disposed between the surface 121 of the mirror 12 and the surface 131 of the mirror 13. The surface 121 of the mirror 12 faces the optical detector 11.

Figure 3H:
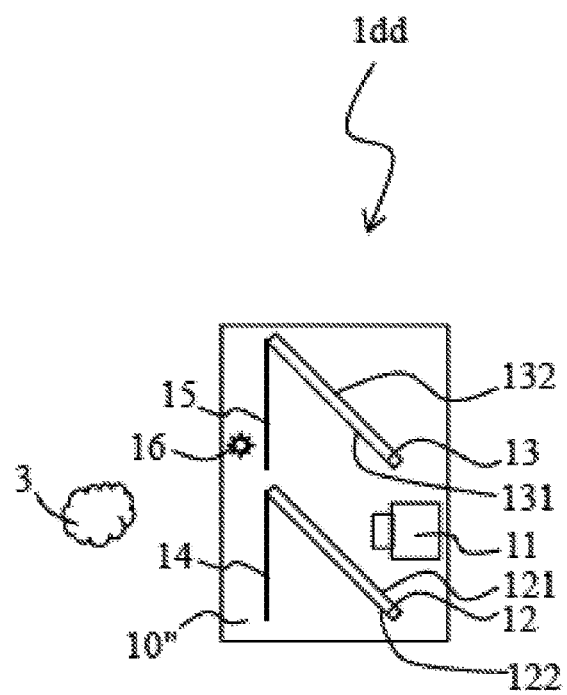
FIG. 3H illustrates another optical apparatus of collecting three dimensional information of an object in accordance with some embodiments of the present disclosure.

FIG. 3H illustrated another optical apparatus of collecting three dimensional information of an object in accordance with some embodiments of the present disclosure. Referring to FIG. 3H, as optical apparatus 1*dd* of collecting three dimensional information of an object 3 is similar to the optical apparatus 1*cc* as illustrated and described with reference to FIG. 3G, except that the optical apparatus 1*dd* further includes an illumination source 16.

Figure 3I:
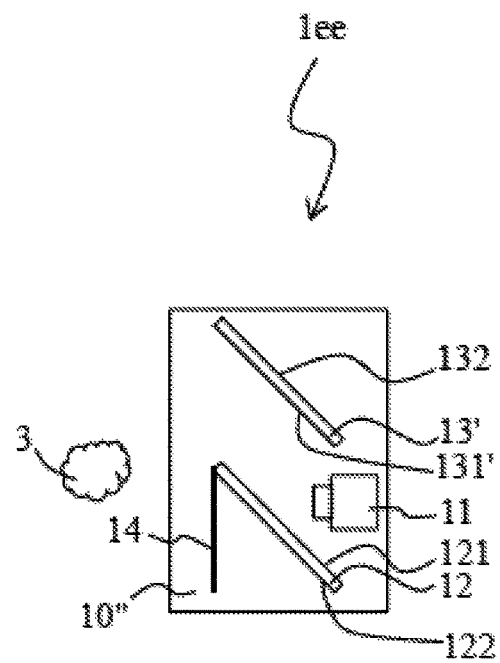
FIG. 3I illustrates another optical apparatus of collecting three dimensional information of an object in accordance with some embodiments of the present disclosure.

FIG. 3I illustrates another optical apparatus of collecting three dimensional information of an object in accordance with some embodiments of the present disclosure. Referring to FIG. 3I, an optical apparatus 1*ee* of collecting three dimensional information of an object 3 is similar to the optical apparatus 1*ee* as illustrated and described with reference to FIG. 3G, except that the mirror 13 is replaced by the mirror 13' and the filter 15 is eliminated.

Figure 3J:
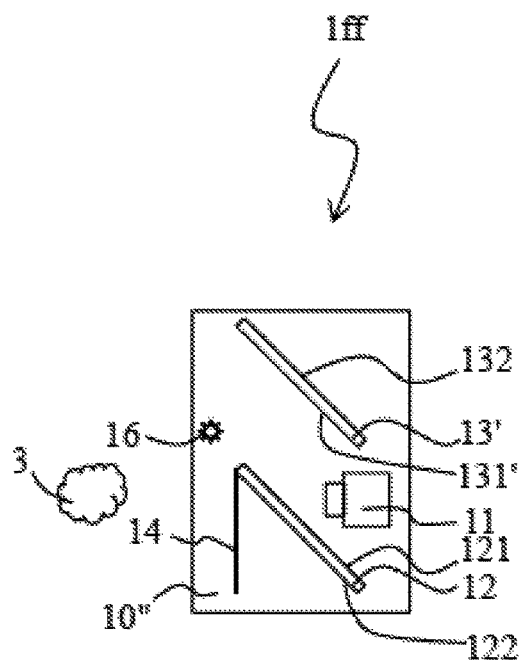
FIG. 3J illustrates another optical apparatus of collecting three dimensional information of an object in accordance with some embodiments of the present disclosure.

FIG. 3J illustrates another optical apparatus of collecting three dimensional information of an object in accordance with some embodiments of the present disclosure. Referring to FIG. 3J, an optical apparatus 1*ff* of collecting three dimensional information of an object 3 is similar to the optical apparatus 1*ee* as illustrated and described with reference to FIG. 3I, except that the optical apparatus 1*ff* further includes an illumination source 16.

Figure 4:
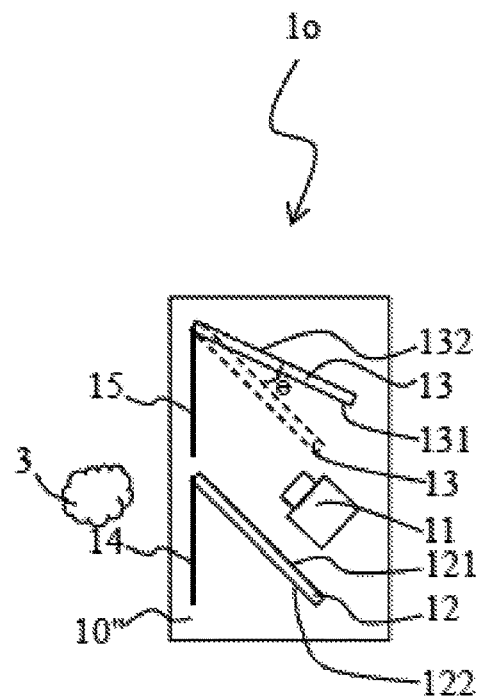
FIG. 4 illustrates another optical apparatus of collecting three dimensional information of an object in accordance with some embodiments of the present disclosure.

FIG. 4 illustrates another optical apparatus of collecting three dimensional information of an object in accordance with some embodiments of the present disclosure. Referring to FIG. 4, an optical apparatus 1*o* of collecting three dimensional information of an object 3 is similar to the optical apparatus 1*h* as illustrated and described with reference to FIG. 3, except that the mirror 13 of FIG. 4 is counterclockwise rotated by an angle θ. The mirror 12 and the mirror 13 may be unparallelly arranged. It is contemplated that the mirror 13 may be clockwise rotated. It is contemplated that the mirror 12 may be rotated.

Figure 4A:
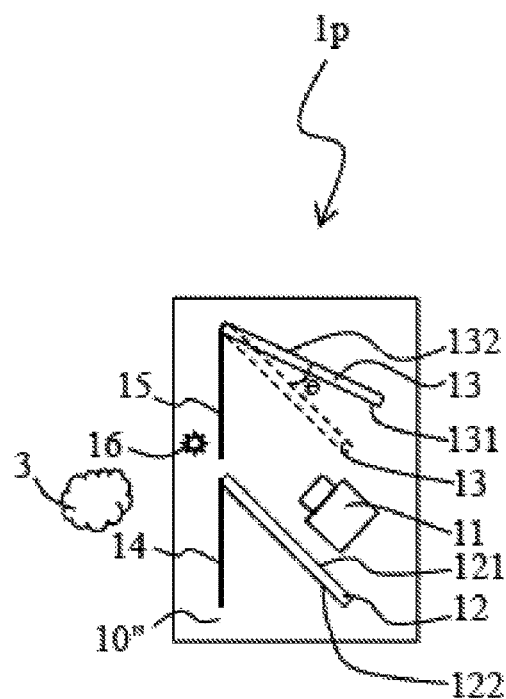
FIG. 4A illustrates another optical apparatus of collecting three dimensional information of an object in accordance with some embodiments of the present disclosure.

FIG. 4A illustrates another optical apparatus of collecting three dimensional information of an object in accordance with some embodiments of the present disclosure. Referring to FIG. 4A, an optical apparatus 1*p* of collecting three dimensional information of an object 3 is similar to the optical apparatus 1*o* as illustrated and described with reference to FIG. 4, except that the optical apparatus 1*p* further includes an illumination source 16.

Figure 4B:
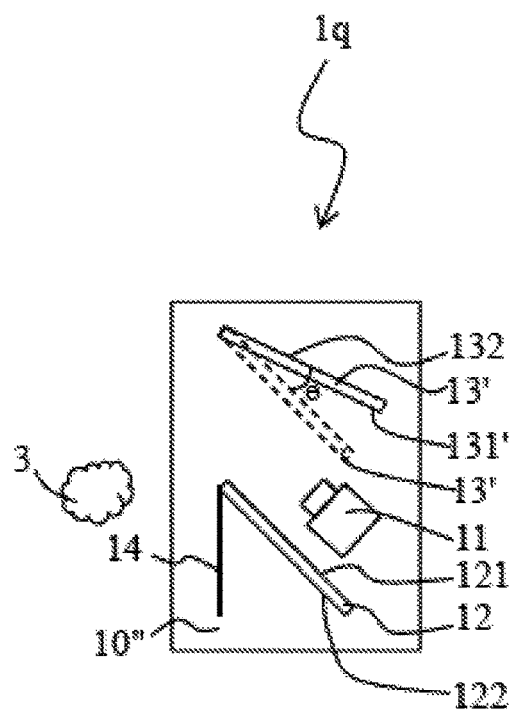
FIG. 4B illustrates another optical apparatus of collecting three dimensional information of an object in accordance with some embodiments of the present disclosure.

FIG. 4B illustrates another optical apparatus of collecting three dimensional information of an object in accordance with some embodiments of the present disclosure. Referring to FIG. 4B, an optical apparatus 1*q* of collecting three dimensional information of an object 3 is similar to the optical apparatus 1*o* as illustrated and described with reference to FIG. 4, except that the mirror 13 is replaced by the mirror 13' and the filter 15 is eliminated.

Figure 4C:
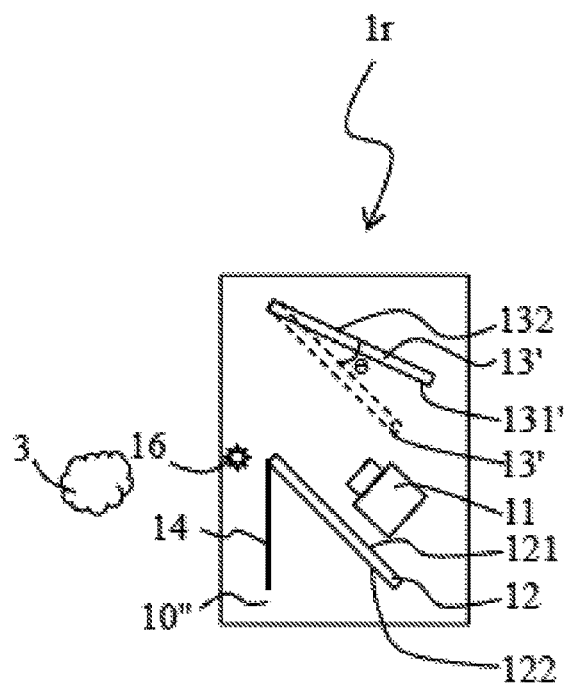
FIG. 4C illustrates another optical apparatus of collecting three dimensional information of an object in accordance with some embodiments of the present disclosure.

FIG. 4C illustrates another optical apparatus of collecting three dimensional information of an object in accordance with some embodiments of the present disclosure. Referring to FIG. 4C, an optical apparatus 1*r* of collecting three dimensional information of an object 3 is similar to the optical apparatus 1*q* as illustrated an described with reference to FIG. 4B, except that the optical apparatus 1*r* further includes an illumination source 16.

Figure 4D:
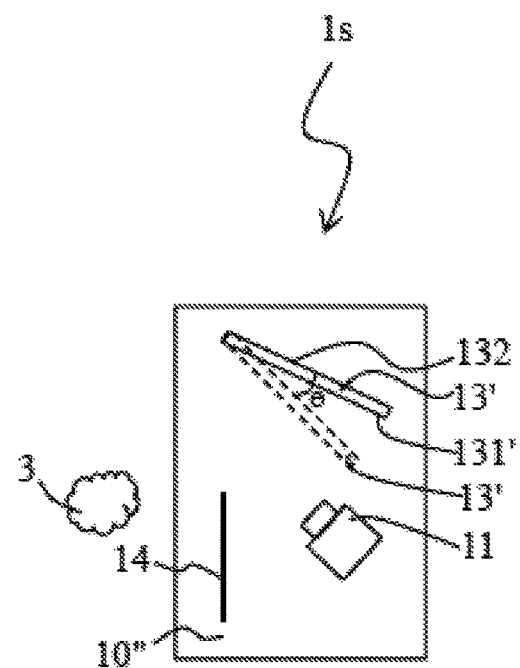
FIG. 4D illustrates another optical apparatus of collecting three dimensional information of an object in accordance with some embodiments of the present disclosure.

FIG. 4D illustrates another optical apparatus of collecting three dimensional information of an object in accordance with some embodiments of the present disclosure. Referring to FIG. 4D, an optical apparatus 1s of collecting three dimensional information of an object 3 is similar to the optical apparatus 1q as illustrated and described with reference to FIG. 4B, except that the mirror 12 is eliminated.

Figure 4E:
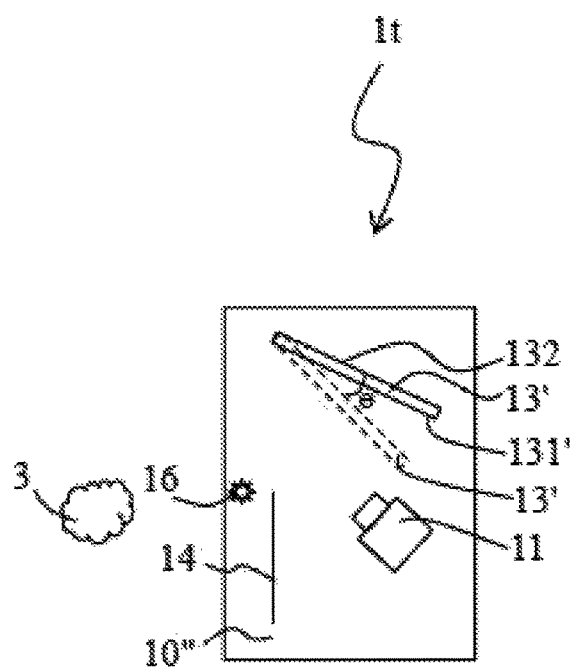
FIG. 4E illustrates another optical apparatus of collecting three dimensional information of an object in accordance with some embodiments of the present disclosure.

FIG. 4E illustrated another optical apparatus of collecting three dimensional information of an object in accordance with some embodiments of the present disclosure. Referring to FIG. 4E, an optical apparatus 1t of collecting three dimensional information of an object 3 is similar to the optical apparatus 1s as illustrated and described with reference to FIG. 4D, except that the optical apparatus 1t further includes an illumination source 16.

Figure 4F:
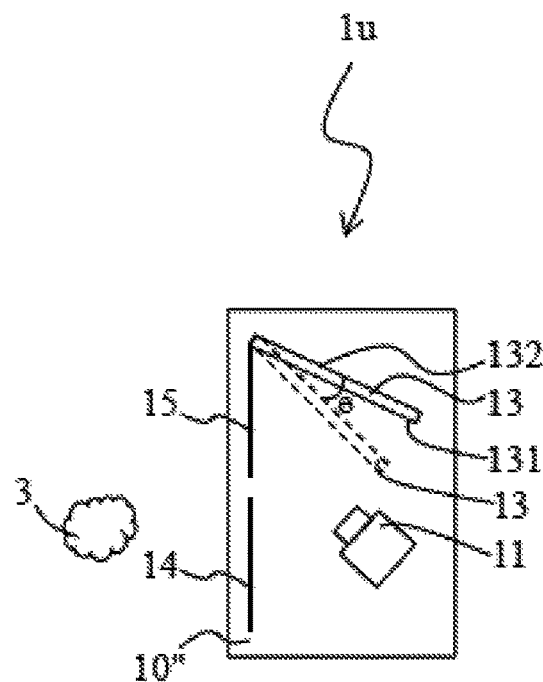
FIG. 4F illustrates another optical apparatus of collecting three dimensional information of an object in accordance with some embodiments of the present disclosure.

FIG. 4F illustrates another optical apparatus of collecting three dimensional information of an object in accordance with some embodiments of the present disclosure. Referring to FIG. 4F, an optical apparatus 1u of collecting three dimensional information of an object 3 is similar to the optical apparatus 1o as illustrated and described with reference to FIG. 4, except that the mirror 12 is eliminated.

Figure 4G:
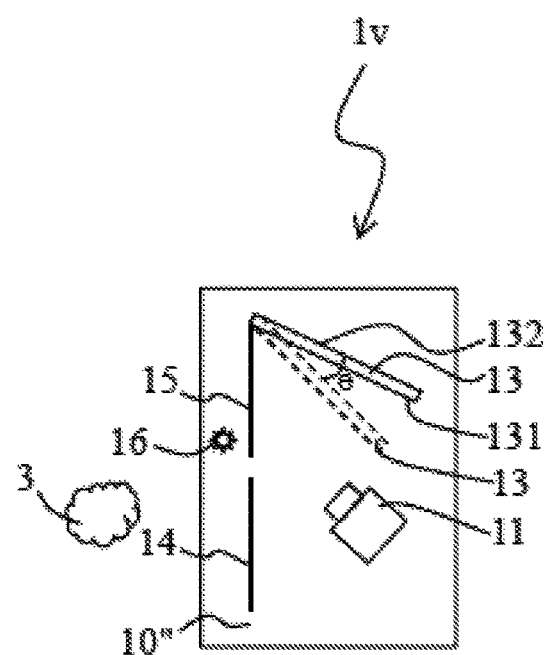
FIG. 4G illustrates another optical apparatus of collecting three dimensional information of an object in accordance with some embodiments of the present disclosure.

FIG. 4G illustrates another optical apparatus of collecting three dimensional information of an object in accordance with some embodiments of the present disclosure. Referring to FIG. 4G, an optical apparatus 1v of collecting three dimensional information of an object 3 is similar to the optical apparatus 1u as illustrated and described with reference to FIG. 4F, except that the optical apparatus 1v further includes an illumination source 16.

Figure 4H:
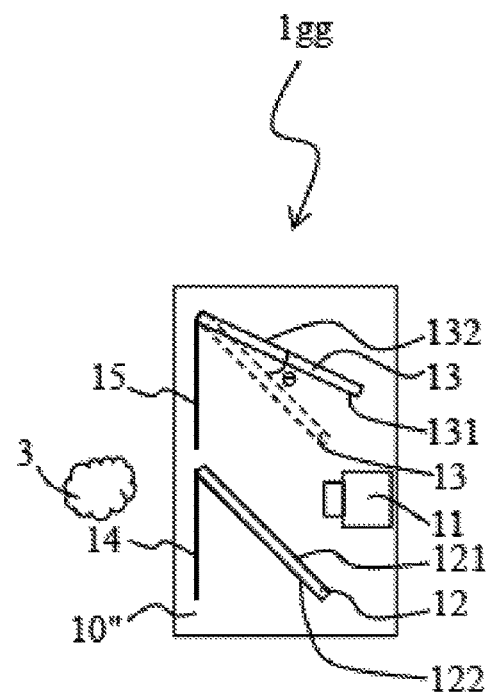
FIG. 4H illustrates another optical apparatus of collecting three dimensional information of an object in accordance with some embodiments of the present disclosure.

FIG. 4H illustrates another optical apparatus of collecting three dimensional information of an object in accordance with some embodiments of the present disclosure. Referring to FIG. 4H, an optical apparatus 1gg of collecting three dimensional information of an object 3 is similar to the optical apparatus 1o as illustrated and described with reference to FIG. 4, except that the detector 11 is further rotated to be substantially parallel to a side of the carrier 10' such that the field of view, the depth of focus and other optical modulus of the detector 11 in view of the light beam 21 and the light beam 22 may be adjusted.

Figure 4I:
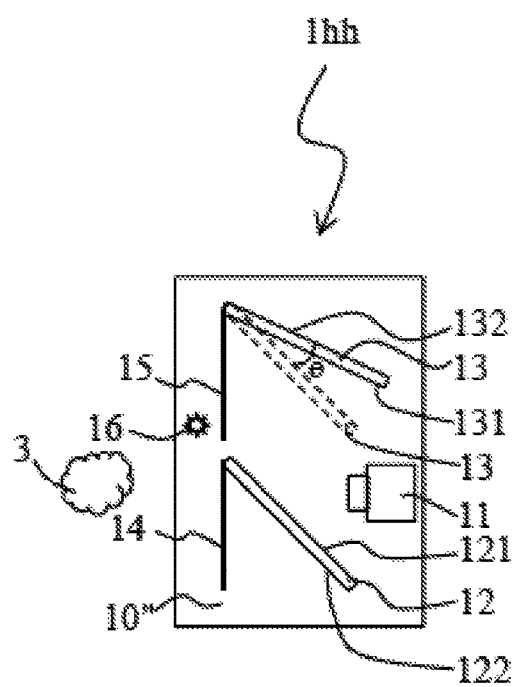
FIG. 4I illustrates another optical apparatus of collecting three dimensional information of an object in accordance with some embodiments of the present disclosure.

FIG. 4I illustrates another optical apparatus of collecting three dimensional information of an object in accordance with some embodiments of the present disclosure. Referring to FIG. 4I, in optical apparatus 1hh of collecting three dimensional information of an object 3 is similar to the optical apparatus 1gg as illustrated and described with reference to FIG. 4H, except that the optical apparatus 1hh further includes an illumination source 16.

Figure 4J:
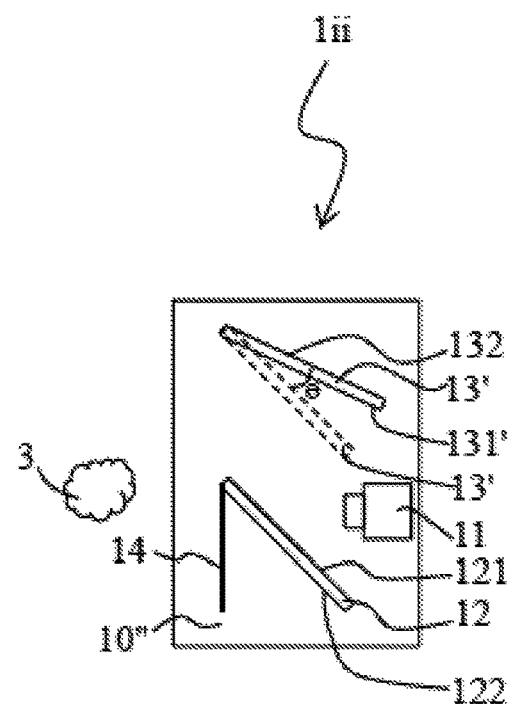
FIG. 4J illustrates another optical apparatus of collecting three dimensional information of an object in accordance with some embodiments of the present disclosure.

FIG. 4J illustrates another optical apparatus of collecting three dimensional information of an object in accordance with some embodiments of the present disclosure. Referring to FIG. 4J, an optical apparatus 1ii of collecting three dimensional information of an object 3 is similar to the optical apparatus 1gg as illustrated and described with reference to FIG. 4H, except that the mirror 13 is replaced by the mirror 13' and the filter 15 is eliminated.

Figure 4K:
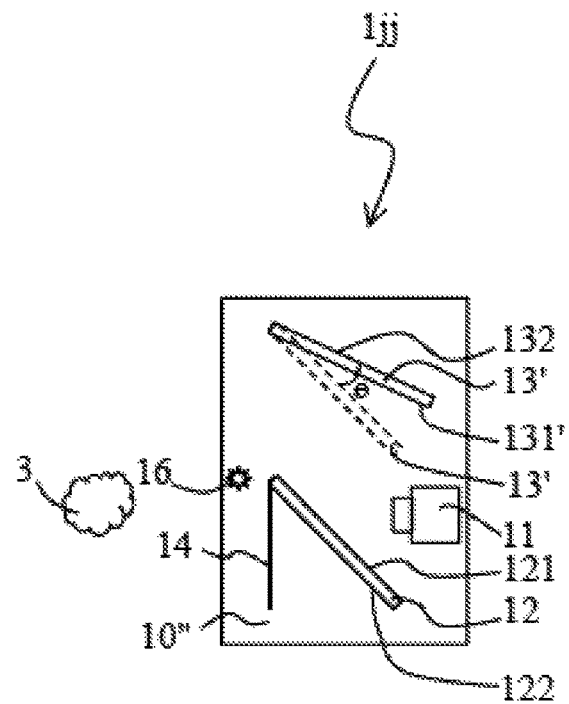
FIG. 4K illustrates another optical apparatus of collecting three dimensional information of an object in accordance with some embodiments of the present disclosure.

FIG. 4K illustrates another optical apparatus of collecting three dimensional information of an object on accordance with some embodiments of the present disclosure. Referring to FIG. 4K, an optical apparatus 1jj of collecting three dimensional information of an object 3 is similar to the optical apparatus 1ii as illustrated and described with reference to FIG. 4J, except that the optical apparatus 1jj further includes an illumination source 16.

Figure 5:
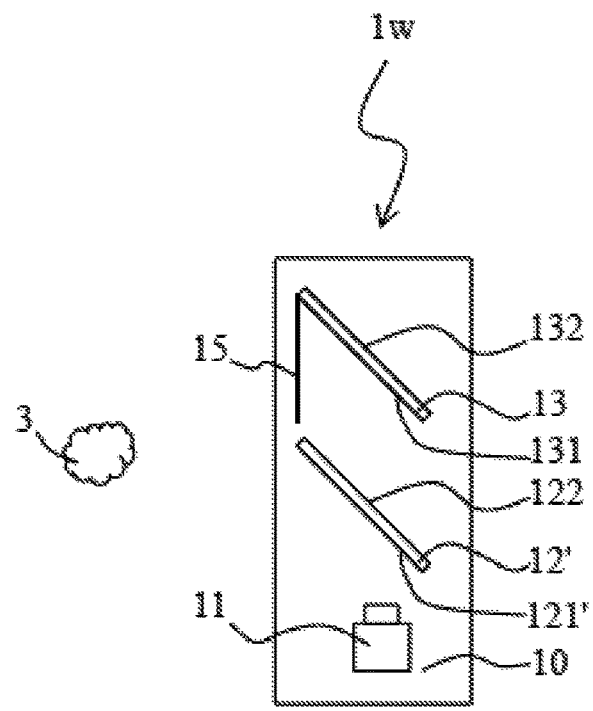
FIG. 5 illustrates another optical apparatus of collecting three dimensional information of an object in accordance with some embodiments of the present disclosure.

FIG. 5 illustrates another optical apparatus of collecting three dimensional information of an object in accordance with some embodiments of the present disclosure. Referring to FIG. 5, an optical apparatus 1w of collecting three dimensional information of an object 3 is similar to the optical apparatus 1 as illustrated and described with reference to FIG. 1, except that the mirror 12 is replaced by the mirror 12' and the filter 14 is eliminated.

Figure 5A:
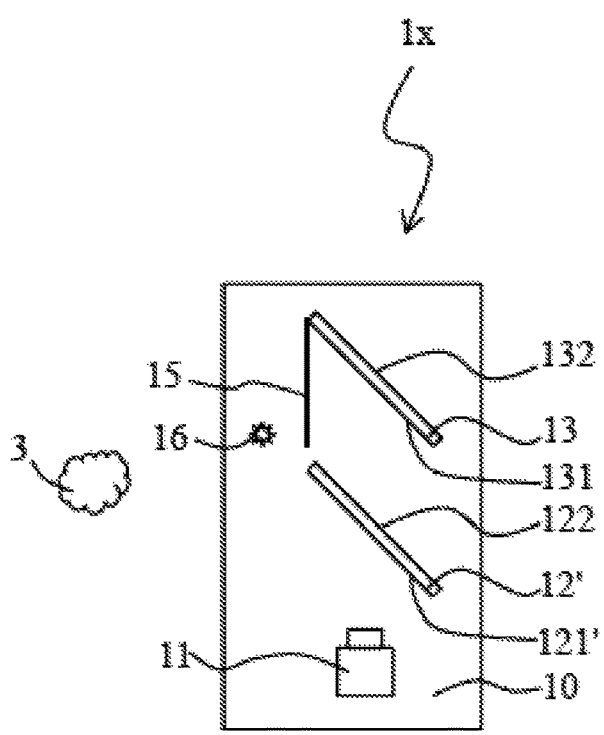
FIG. 5A illustrates another optical apparatus of collecting three dimensional information of an object in accordance with some embodiments of the present disclosure.

FIG. 5A illustrates another optical apparatus of collecting three dimensional information of an object in accordance with some embodiments of the present disclosure. Referring to FIG. 5A, an optical apparatus 1x of collecting three dimensional information of an object 3 is similar to the optical apparatus 1w as illustrated and described with reference to FIG. 5, except that the optical apparatus 1x further includes an illumination source 16.

Figure 5B:
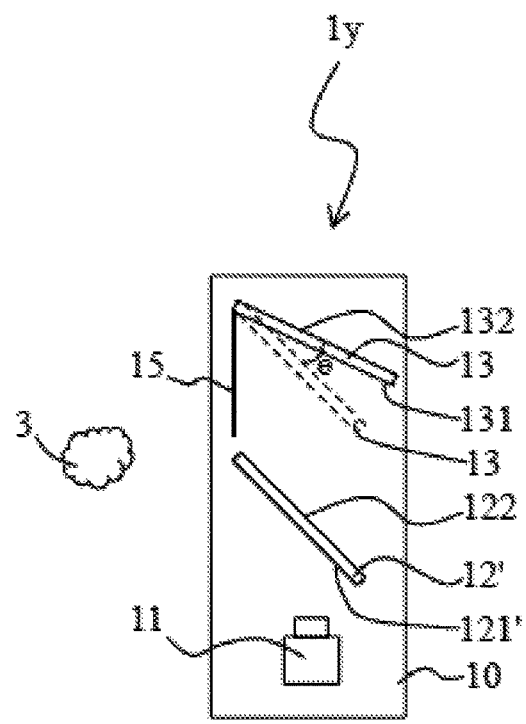
FIG. 5B illustrates another optical apparatus of collecting three dimensional information of an object in accordance with some embodiments of the present disclosure.

FIG. 5B illustrates another optical apparatus of collecting three dimensional information of an object in accordance with some embodiments of the present disclosure. Referring to FIG. 5B, an optical apparatus 1y of collecting three dimensional information of an object 3 is similar to the optical apparatus 1w as illustrated and described with reference to FIG. 5, except that the mirror 13 of FIG. 5B is counterclockwise rotated by an angle θ. The mirror 12 and the mirror 13 may be unparallelly arranged. It is contemplated that the mirror 13 may be clockwise rotated. It is contemplated that the mirror 12 may be rotated.

Figure 5C:
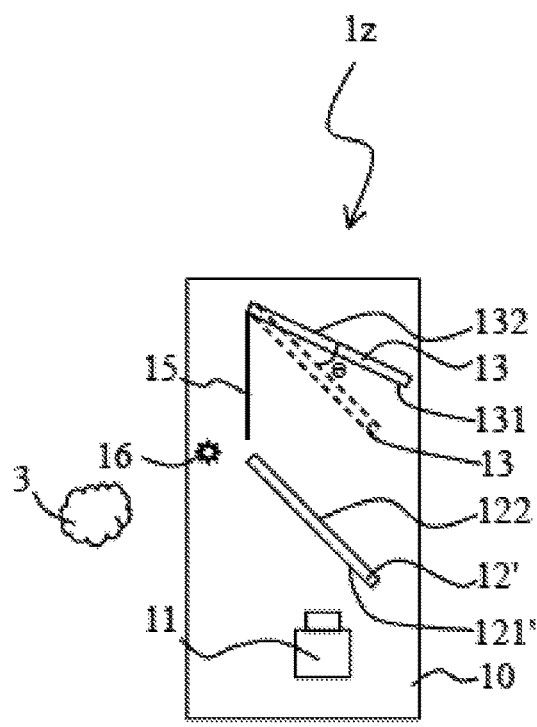
FIG. 5C illustrates another optical apparatus of collecting three dimensional information of an object in accordance with some embodiments of the present disclosure.

FIG. 5C illustrates another optical apparatus of collecting three dimensional information of an object in accordance with some embodiments of the present disclosure. Referring to FIG. 5C, an optical apparatus 1z of collecting three dimensional information of an object 3 is similar to the optical apparatus 1y as illustrated and described with reference to FIG. 5B, except that the optical apparatus 1z further includes an illumination source 16.

Figure 6:
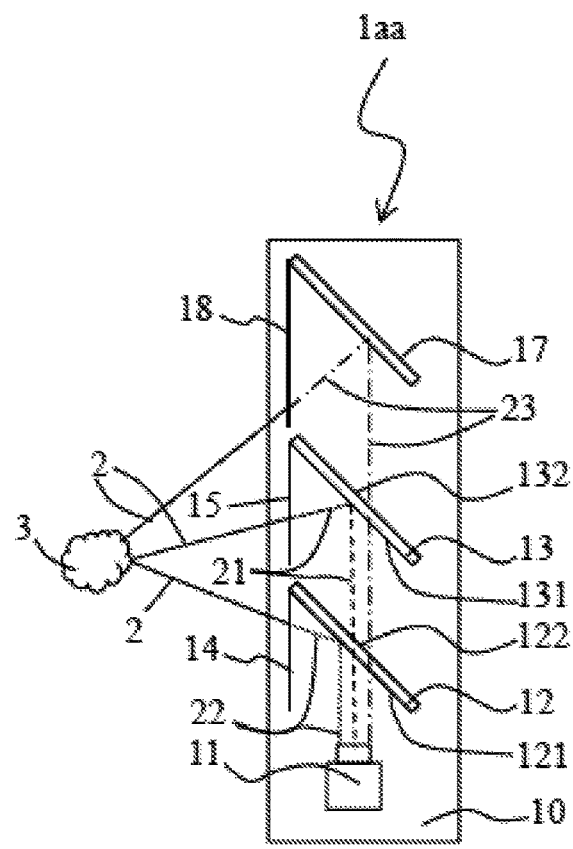
FIG. 6 illustrates another optical apparatus of collecting three dimensional information of an object in accordance with some embodiments of the present disclosure.

FIG. 6 illustrates another optical apparatus of collecting three dimensional information of an object in accordance with some embodiments of the present disclosure. Referring to FIG. 6, an optical apparatus 1aa of collecting three dimensional information of an object 3 is similar to the optical apparatus 1 as illustrated and described with reference to FIG. 1, except that the optical apparatus 1aa further includes an optional optical module which include a mirror 17 and a filter 18 to provide a light beam 23 of a wavelength range or spectrum from approximately 440 nm to approximately 460 nm. The light beam 23 may include, for example but is not limited to one of violet, blue, yellow, or orange light. The light beam 23 may have a wavelength range or spectrum different from the light beam 21 or the light beam 22.

The filter 18 is disposed, between the object 3 and the mirror 17. Ambient light (not shown in FIG. 6) which is incident of the object 3 may be reflected by the object 3. The filter 18 receives light 2 reflected from or the object 3 and outputs the light beam 23. For example, the filter 18 may be but is not limited to one of violet, blue, yellow, or orange light filter. The light beam 23 of the reflected light 2 may pass the filter 18 (while the rest of the reflected light 2 other than the light beam 23 may be blocked or absorbed by the filter 18). The light beam 23 which is incident on the mirror 17 may be directed to the optical detector 11.

The mirror 17 may be the same or similar to the mirror 13 as illustrated and described with reference to FIG. 1B and FIG. 1C.

It is contemplated that another optional optical module similar to the optional optical module (which includes the mirror 17 and the filter 18) may be also included in the optical apparatus 1aa.

The optical detector 11 may sense or detect the light beam 23. The optical detector 11 receives the light beam 21, the light beam 22 and the light beam 23 from different positions.

Figure 6A:
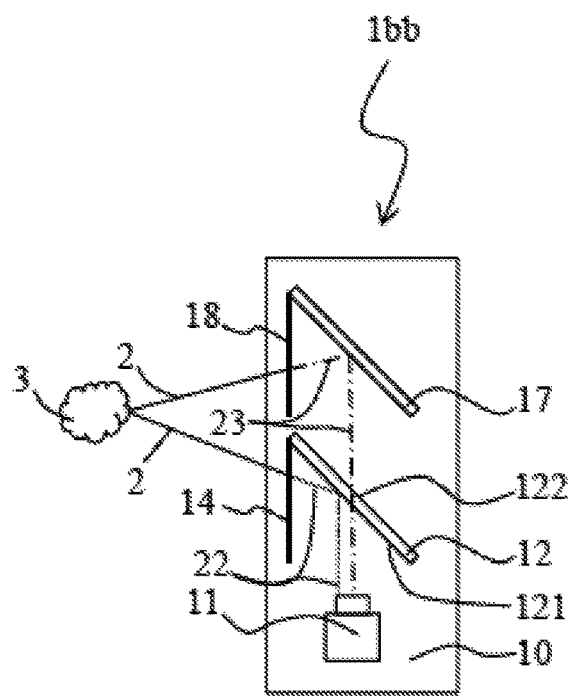
FIG. 6A illustrates another optical apparatus of collecting three dimensional information of an object in accordance with some embodiments of the present disclosure.

FIG. 6A illustrates another optical apparatus of collecting three dimensional information of an object in accordance with some embodiments of the present disclosure. Referring to FIG. 6A, an optical apparatus 1bb of collecting three dimensional information of an object 3 is similar to the optical apparatus 1 as illustrated and described with reference to FIG. 1, except that the mirror 13 and the filter 15 are replaced by the mirror 17 (as shown in FIG. 6) and the filter 18 (as shown in FIG. 6). It is contemplated that the mirror 12 and the filter 14 of the optical apparatus 1bb may be replaced by the mirror 17 (at shown in FIG. 6) and the filter 18 (as shown in FIG. 6).

Referring back to FIG. 1, it is contemplated that the optical apparatus 1 may include one or more optional optical module (which includes the mirror 17 and the filter 18) as illustrated and described with reference to FIG. 6 and FIG. 6A.

It is contemplated that the electronics (e.g. the controller) of the optical apparatus 1 may replace the optical module (which includes the mirror 12 and the filter 14) by the optional optical module (which includes the mirror 17 and the filter 18). It is contemplated that the optical module (which includes the mirror 12 and the filter 14) and the optional optical module (which includes the mirror 17 and the filter 18) can be switched by the electronics (e.g. the controller) of the optical apparatus 1.

It is contemplated that the electronics (e.g. the controller) of the optical apparatus 1 may replace the optical module (which includes the mirror 13 and the filter 15) by the optional optical module (which includes the mirror 17 and the filter 18). It is contemplated that the optical module (which includes the mirror 13 and the filter 15) and the optional optical module (which includes the mirror 17 and the filter 18) can be switched by the electronics (e.g. the controller) of the optical apparatus 1.

FIG. 7A illustrates an image 30 of an object 3 in accordance with some embodiments of the present disclosure. Optical information of the light beam 21 and the light beam 22 may be collected or received by the optical detector 11 and stored to the electronics (e.g. memory). Geometric information (e.g. position) of components (e.g. optical detector 11, mirrors 12 and 13, and filters 14 and 15, etc.) may be stored in the memory. The electronics (e.g. a processor) or an external computing device electrically connected to the optical apparatuses as described above may determine the image 30 in accordance with the optical and geometric information. The image 30 may be decomposed to images 31 and 32 in accordance with optical information received by the optical detector 11. Disparity between images 31 and 32 may be used to determine a three dimensional data of the object 3 by, for example but is not limited to triangulation technique.

FIG. 7B illustrates an image of an object in accordance with some embodiments of the present disclosure. Referring to FIG. 7A, an image 31 of the object 3 may include information associated with the light beam 21. The image 31 of the object 3 may include information associated with position of the mirror 13 or 13'. The image 31 of the object 3 may include information associated with position of the optical detector 11.

FIG. 7C illustrates an image of an object in accordance with some embodiments of the present disclosure. Referring to FIG. 7B, an image 32 of the object 3 may include information associated with the light beam 22. The image 32 of the object 3 may include information associated with position of the mirror 12 or 12'. The image 32 of the object 3 may include information associated with position of the optical detector 11.

In accordance with some embodiments of the present disclosure, an optical apparatus of collecting three dimensional information of an object includes a first optical module, a second optical module and an optical detector. The first optical module provides a first light beam of a first wavelength range in accordance with light reflected from the object. The second optical module provides a second light beam of a second wavelength range in accordance with the light reflected from the object. The optical detector detects the first light beam and the second light beam.

In accordance with some embodiments of the present disclosure, a method of collecting three dimensional information of an object includes: receiving a first light beam of a first wavelength range in accordance with light reflected from the object; and receiving a second light beam of a second wavelength range in accordance with the light reflected from the object.

In accordance with some embodiments of the present disclosure, an optical apparatus of collecting three dimensional information of an object includes an optical detector, a first optical module and a second optical module. The optical detector detects a first light beam of a first wavelength range and a second light beam of a second wavelength range. The first optical module directly provides the first light beam in accordance with light reflected from the object to the optical detector. The second optical module provides the second light beam in accordance with the light reflected from the object to the optical detector.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical apparatus for collection of three dimensional information of an object, comprising:
    a first mirror configured to reflect a first light beam of a first wavelength range based on light reflected from the object;
    a second mirror configured to reflect a second light beam of a second wavelength range based on the light reflected from the object;
    an optical detector configured to detect the first light beam and the second light beam; and
    a memory configured to store the detected first light beam and the detected second light beam,
    wherein the first light beam, subsequent to the reflection from the first mirror, passes through the second mirror to the optical detector.

2. The optical apparatus of claim 1, wherein the optical detector is below the first mirror and the second mirror.

3. The optical apparatus of claim 1, further comprising a first filter between the object and a first surface of the first mirror, wherein the first filter is configured to receive the light reflected from the object and output the first light beam to the first surface of the first mirror, and wherein the first surface of the first mirror is configured to direct the first light beam to the optical detector.

4. The optical apparatus of claim 1,
wherein the first mirror comprises an optical film on a first surface of the first mirror,
wherein the optical film is configured to receive the light reflected from the object and output the first light beam to the first surface of the first mirror, and
wherein the first surface of the first mirror is configured to direct the first light beam to the optical detector.

5. The optical apparatus of claim 1, further comprising a second filter between the object and a first surface of the second mirror,
wherein the second filter is configured to receive the light reflected from the object and output the second light beam to the first surface of the second mirror, and
wherein the first surface of the second mirror is configured to direct the second light beam to the optical detector.

6. The optical apparatus of claim 1,
wherein the second mirror comprises a first surface with an optical film,
wherein the optical film is configured to receive the light reflected from the object and output the second light beam to the first surface of the second mirror, and
wherein the first surface of the second mirror is configured to direct the second light beam to the optical detector.

7. The optical apparatus of claim 1, further comprising a second filter between the object and a first surface of the second mirror,
wherein a second surface of the second mirror is opposite to the first surface of the second mirror,
wherein the second surface of the second mirror is configured to allow the first light beam to pass through the second mirror,
wherein the second filter is configured to receive the light reflected from the object and output the second light beam to the first surface of the second mirror, and
wherein the first surface of the second mirror is configured to direct the second light beam to the optical detector.

8. The optical apparatus of claim 1,
wherein the second mirror comprises a first surface and a second surface opposite the first surface,
wherein the second surface is configured to allow the first light beam to pass through the second mirror,
wherein the first surface comprises an optical film,
wherein the optical film is configured to receive the light reflected from the object and output the second light beam to the first surface of the second mirror, and
wherein the first surface of the second mirror is configured to direct the second light beam to the optical detector.

9. The optical apparatus of claim 1, further comprising a third mirror configured to reflect a third light beam of a third wavelength range based on the light reflected from the object, wherein the optical detector is further configured to detect the third light beam.

10. The optical apparatus of claim 9, further comprising a controller configured to switch between the first mirror and the third mirror.

11. The optical apparatus of claim 1, further comprising an illumination source configured to illuminate a light pattern of the first wavelength range and the second wavelength range.

12. A method of collecting three dimensional information of an object, comprising:
receiving, from a first mirror, a first light beam of a first wavelength range based on light reflected from the object; and
receiving, from a second mirror, a second light beam of a second wavelength range based on the light reflected from the object; and
storing the first light beam and the second light beam in a memory,
wherein the first light beam, subsequent to the reflection from the first mirror, passes through the second mirror to an optical detector.

13. The method of claim 12, further comprising:
receiving the first light beam from a first position that corresponds to the first mirror; and
receiving the second light beam from a second position that corresponds to the second mirror, wherein the first position is different from the second position.

14. The method of claim 12, further comprising receiving a third light beam of a third wavelength range based on the light reflected from the object.

15. An optical apparatus for collection of three dimensional information of an object, comprising:
an optical detector configured to detect a first light beam of a first wavelength range and a second light beam of a second wavelength range;
a first filter between the object and the optical detector, wherein the first filter is configured to receive light reflected from the object and output the first light beam;
a first mirror between the first filter and the optical detector, wherein the first mirror comprises a first surface and a second surface opposite the first surface,
wherein the first surface of the first mirror faces the optical detector,
wherein the second surface of the first mirror is configured to allow the first light beam output from the first filter to pass through the first mirror to the optical detector;
a second mirror configured to reflect the second light beam to the first surface of the first mirror based on the light reflected from the object,
wherein the first surface of the first mirror is configured to reflect the second light beam, subsequent to the reflection from the second mirror, to the optical detector; and
a memory configured to store the detected first light beam and the detected second light beam.

16. The optical apparatus of claim 15, further comprising a second filter between the object and a first surface of the second mirror,
wherein the second filter is configured to receive the light reflected from the object and output the second light beam to the first surface of the second mirror, and
wherein the first surface of the second mirror is configured to direct the second light beam to the optical detector.

17. The optical apparatus of claim 15, further comprising a second filter between the object and a first surface of the second mirror,
wherein the second filter is configured to receive the light reflected from the object and output the second light beam to the first surface of the second mirror, wherein the first surface of the second mirror is configured to direct the second light beam to the first surface of the first mirror, and wherein the first surface of the first mirror is further configured to direct the second light beam to the optical detector.

\* \* \* \* \*